July 17, 1951 M. K. LAPORTE 2,560,653

LIGHTING ATTACHMENT FOR TELEPHONES

Filed Dec. 21, 1949

INVENTOR

MARIE K. LAPORTE

BY Shepherd & Campbell

ATTORNEYS

Patented July 17, 1951 2,560,653

UNITED STATES PATENT OFFICE 2,560,653

LIGHTING ATTACHMENT FOR TELEPHONES

Marie K. Laporte, Arlington, Va.

Application December 21, 1949, Serial No. 134,243

3 Claims. (Cl. 179—90)

This invention relates to illuminating means for telephones of the conventional desk hand set and dial type. Its object is to provide a simple means for automatically energizing a light when the telephone receiver is lifted from the base. Such an arrangement is of utility in several respects. For one thing it provides light for writing messages upon a pad; it gives limited illumination in an otherwise darkened room if another person has to be called to the telephone and it furnishes light on the dial for dialing when another number is being called. This illuminating means is of especial utility upon bedside phones when a person does not wish to get up to turn on the room lights.

A further object of the invention is to provide an illuminating means of the character set forth which may be incorporated in one of the ornamental plastic shells in which telephones are now being encased, so that the act of placing such a shell over the telephone automatically brings the illuminating means into coactive relation to the conventional telephone dial.

The invention will be best understood by reference to the accompanying drawing wherein.

Figure 1:
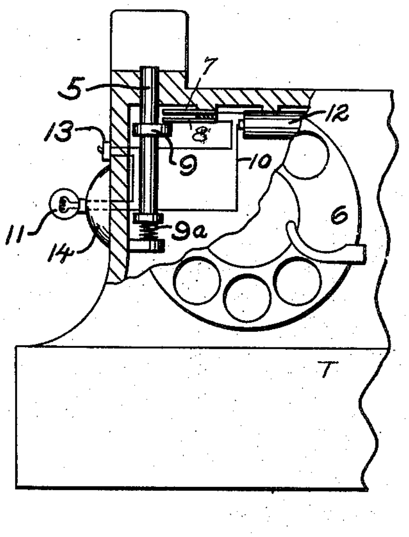
Fig. 1 is a fragmentary vertical section through the case of a conventional telephone having the lighting attachment applied thereto.
Figure 2:
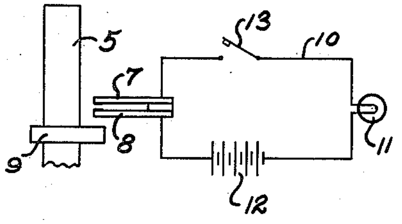
Fig. 2 is a diagrammatic view of the lighting circuit of Fig. 1.

Referring now to Figs. 1 and 2, 5 designates one of the switching plungers of a conventional telephone the dial of which is indicated at 6. When the receiver (not shown in these figures) is lifted to the ear, this plunger, under conventional operation, rises to connect the telephone to a central station. The handset normally rests upon and depresses the plunger when the telephone is not in use. I utilize this same plunger action to close a lighting circuit which includes a pair of contact strips 7 and 8, which are brought into engagement with each other by a collar 9 on plunger 5 when said plunger rises under the action of its spring 9*a*. The contact strips are part of a circuit 10 which includes a small electric lamp 11, a source of current 12 which may be a small battery and a cut off switch 13. The electric lamp may be mounted on a small rubber suction cup 14 by which the lamp may be supported in any desired position in or about the telephone.

Figure 3:
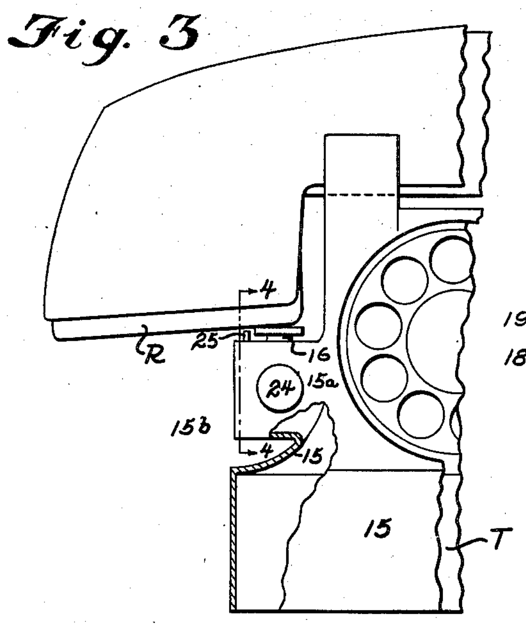
Fig. 3 is a partial face view of an ornamental plastic shell which fits over the telephone base and having lighting means associated therewith.
Figure 4:
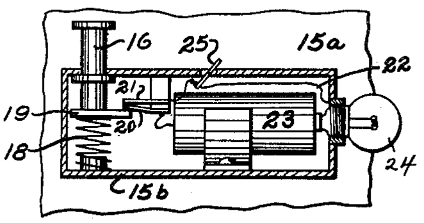
Fig. 4 is a sectional view on line 4—4 of Fig. 3.

In Figs. 3 and 4, 15 designates a hollow plastic shell dimensioned to fit snugly over the base of a conventional telephone to form an ornamental cover. These devices have found wide favor and I propose to use them to carry a lighting means in such a way that the act of applying the plastic shield to the telephone automatically brings a light controlling switch in position to be contacted by the receiver R when the latter is in place on the base, to thereby open the light circuit, said switch automatically moving to closed position to energize the light when the receiver is lifted to the ear. To effect this the shell is provided upon its side wall 15*a* with a switch box 15*b*. This switch box may be molded as a part of the plastic shell or be a separate element, as desired. A plunger 16 projects above the top of the switch box and lies in position to be engaged and depressed by the receiver R when the said receiver is placed upon the base. This plunger functions in the same way that plunger 5 functions, in that when it rises under the action of a spring 18 a collar 19 thereon moves a contact strip 20 into engagement with a strip 21. Strips 20 and 21 complete a circuit 22 in which a battery 23, an electric light 24 and a shut off switch 25 are included. The electric light may be mounted on the box 15*b* and the battery may be of the flash light type and be housed in said box. Thus the whole assembly is self contained, may be put on the market as an article of manufacture and serves to mount a light and its controlling elements in operative relation upon a telephone without drilling into the telephone and by the mere act of snapping the more or less elastic shell into place upon the telephone.

It is to be understood that the invention is not limited to the precise construction set forth herein but it includes within its purview whatever changes fairly come within either the terms or the spirit of the appended claims.

Having described my invention, what I claim is:

1. In combination, a thin, elastic ornamental shell dimensioned to snugly conform to and embrace and grip a telephone of the type wherein the telephone handset when at rest upon the base has its ends projecting beyond the base and depending below the top thereof, said shell being so formed as to present an integral, outstanding box-like member upon one side wall thereof, the inner side of which box-like member is open to the interior of said shell, said open side being closed by the presence of the base when the shell is placed thereon, an electric light, a local electric circuit for energizing said light, a source of electrical energy in said circuit, a controlling switch for said circuit housed in said box, a light, said switch including a vertically movable plunger which projects from the box and is engageable by the overlying receiver when the latter is placed upon the base, to break the said circuit, said shell having an opening formed in its front wall for the passage of the conventional dial of a dial telephone and said light being mounted on the wall of said box in position to illuminate said dial when lighted.

2. A lighting attachment for telephones of the conventional desk hand set and dial type comprising in combination a thin ornamental, plastic shell dimensioned to snugly conform to and embrace a telephone of the desk, hand set type, said shell having an opening formed in its front wall through which the dial projects when said shell is applied to the base, an electric light mounted upon an outside face of said shell and adjacent the front wall thereof in a position to illuminate the face of the dial when lighted, and to aid in illuminating the room in which the telephone is located, an electric circuit in which said light is included, a source of current for said circuit, a circuit closing member in said circuit constituting an electric switch which is mounted upon and carried bodily by said shell and is so positioned as to lie in the path of movement of the handset and arranged to interrupt the circuit when the handset is placed in idle position upon the telephone and to complete the circuit and light the light and illuminate the outer face of the dial when the handset is lifted from the telephone.

3. A lighting attachment for telephones of the conventional desk handset and dial type comprising in combination a thin ornamental, plastic shell dimensioned to snugly conform to and embrace a telephone of the desk, handset type, said shell having an opening formed in its front wall through which the dial projects when said shell is applied to the base, an electric light mounted upon and carried bodily by the shell and so positioned under the shell that when the shell is placed upon the base said light will lie in position to illuminate the face of the dial when lighted, and also in position to aid in illuminating the room in which the telephone is located, an electric circuit in which said light is included, means for supplying energy to said circuit to light the light, a circuit closing member in said circuit constituting an electric switch which is mounted upon and carried bodily by said shell and is so positioned as to lie in the path of movement of the handset and arranged to interrupt the circuit when the handset is placed in idle position upon the telephone and to complete the circuit and light the light and illuminate the outer face of the dial when the handset is lifted from the telephone.

MARIE K. LAPORTE.

REFERENCES CITED

The following references are of record in the file of this patent:

UNITED STATES PATENTS

| Number | Name | Date |
|---|---|---|
| D. 155,347 | Katz | Sept. 27, 1949 |
| 2,247,591 | Sundee | July 1, 1941 |
| 2,259,148 | Burkhart | Oct. 14, 1941 |
| 2,316,540 | Danley | Apr. 13, 1943 |
| 2,442,988 | Satz | June 8, 1948 |
| 2,464,595 | Masabny | Mar. 15, 1949 |
| 2,473,775 | Allen | June 21, 1949 |
| 2,516,676 | Caroselli | July 25, 1950 |

Certificate of Correction

Patent No. 2,560,653

July 17, 1951

MARIE K. LAPORTE

It is hereby certified that error appears in the printed specification of the above numbered patent requiring correction as follows:

Column 4, line 7, for "under" read *upon*;

and that the said Letters Patent should be read as corrected above, so that the same may conform to the record of the case in the Patent Office.

Signed and sealed this 5th day of February, A. D. 1952.

[SEAL]

THOMAS F. MURPHY,
*Assistant Commissioner of Patents.*